US012248223B2

(12) United States Patent
Chen et al.

(10) Patent No.: US 12,248,223 B2
(45) Date of Patent: Mar. 11, 2025

(54) ELECTRODE STRUCTURE, DISPLAY PANEL, AND ELECTRONIC DEVICE

(71) Applicants: WUHAN BOE OPTOELECTRONICS TECHNOLOGY CO., LTD., Wuhan (CN); BOE TECHNOLOGY GROUP CO., LTD., Beijing (CN)

(72) Inventors: Xiaoxiao Chen, Beijing (CN); Yang Hu, Beijing (CN); Chuang Chen, Beijing (CN); Yuanhui Guo, Beijing (CN); Peng Jiang, Beijing (CN); Xia Shi, Beijing (CN); Yujie Gao, Beijing (CN); Ning Zhu, Beijing (CN); Yun Li, Beijing (CN); Jiantao Liu, Beijing (CN)

(73) Assignees: WUHAN BOE OPTOELECTRONICS TECHNOLOGY CO., LTD., Wuhan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/760,308

(22) Filed: Jul. 1, 2024

(65) Prior Publication Data
US 2024/0353724 A1    Oct. 24, 2024

Related U.S. Application Data

(63) Continuation of application No. 17/764,734, filed as application No. PCT/CN2022/071870 on Jan. 13, 2022, now Pat. No. 12,078,898.

(30) Foreign Application Priority Data

Jan. 13, 2021  (CN) .......................... 202110041652.X
Mar. 25, 2021  (WO) ................ PCT/CN2021/083044
Apr. 6, 2021   (WO) ................ PCT/CN2021/085622

(51) Int. Cl.
G02F 1/1362    (2006.01)
G02F 1/1368    (2006.01)

(52) U.S. Cl.
CPC ...... *G02F 1/136286* (2013.01); *G02F 1/1368* (2013.01)

(58) Field of Classification Search
CPC ........... G02F 1/134309; G02F 1/13439; G02F 2001/134372
See application file for complete search history.

(56) References Cited

U.S. PATENT DOCUMENTS 8,987,746 B2   3/2015  Chung et al.
9,335,591 B2   5/2016  Jin et al.
(Continued)

FOREIGN PATENT DOCUMENTS

CN    1963606 A     5/2007
CN    101968585 A   2/2011
(Continued)

OTHER PUBLICATIONS

International Search Report in Chinese in PCT/CN2022/071870, mailed Mar. 22, 2022, with English translation.
(Continued)

*Primary Examiner* — Jonathan Y Jung
(74) *Attorney, Agent, or Firm* — Collard & Roe, P.C.; William Collard

(57) ABSTRACT

An electrode structure, a display panel, an electronic device are provided, the electrode structure includes a first electrode portion, a second electrode portion and a conductive connection portion, the first electrode portion includes a first connection bar having a first side and a second side and a plurality of first electrode strips, ends of adjacent first (Continued)

electrode strips away from the first connection bar are open; the second electrode portion includes a second connection bar at a position of the first side away from the second side and a plurality of second electrode strips, the second connection bar includes a third side and a fourth side; the second electrode strips are connected with the second connection bar, ends of adjacent second electrode strips away from the second connection bar are open; ends of the conductive connection portion are connected with the first connection bar and the second connection bar.

20 Claims, 6 Drawing Sheets

(56) References Cited

U.S. PATENT DOCUMENTS

| | | | |
|---|---|---|---|
| 9,442,333 | B2 | 9/2016 | Um et al. |
| 9,858,870 | B2 | 1/2018 | Huang et al. |
| 9,897,865 | B2 | 2/2018 | Jiang et al. |
| 9,971,219 | B1* | 5/2018 | Liu .................. G02F 1/136227 |
| 9,995,976 | B2 | 6/2018 | Jia et al. |
| 10,162,226 | B2 | 12/2018 | Guo |
| 10,254,597 | B2 | 4/2019 | Xu |
| 10,429,708 | B2 | 10/2019 | Liu et al. |
| 11,099,437 | B2 | 8/2021 | Cheng et al. |
| 2002/0126241 | A1 | 9/2002 | Kurahashi et al. |
| 2008/0123030 | A1 | 5/2008 | Song |
| 2009/0128727 | A1 | 5/2009 | Yata |
| 2009/0185125 | A1 | 7/2009 | Hida et al. |
| 2010/0201933 | A1* | 8/2010 | Sonoda ............. G02F 1/133305 349/141 |
| 2010/0265448 | A1 | 10/2010 | Nakanishi et al. |
| 2014/0160401 | A1 | 6/2014 | Yonemura et al. |
| 2015/0009465 | A1* | 1/2015 | Park ....................... G02F 1/1393 349/139 |
| 2015/0108486 | A1* | 4/2015 | Um ...................... G02F 1/1368 257/72 |
| 2015/0146117 | A1 | 5/2015 | Lee |
| 2017/0153480 | A1 | 6/2017 | Lv |
| 2017/0199410 | A1 | 7/2017 | Jiang et al. |
| 2019/0041710 | A1* | 2/2019 | Liu ................... G02F 1/133345 |
| 2019/0129222 | A1 | 5/2019 | Cao |
| 2020/0174300 | A1 | 6/2020 | Cheng et al. |
| 2022/0373843 | A1 | 11/2022 | Chen et al. |
| 2023/0221604 | A1 | 7/2023 | Ling et al. |

FOREIGN PATENT DOCUMENTS

| | | |
|---|---|---|
| CN | 202141876 U | 2/2012 |
| CN | 103488002 A | 1/2014 |
| CN | 103885256 A | 6/2014 |
| CN | 103941490 A | 7/2014 |
| CN | 104133312 A | 11/2014 |
| CN | 104181735 A | 12/2014 |
| CN | 104199223 A | 12/2014 |
| CN | 204422931 U | 6/2015 |
| CN | 105158995 A | 12/2015 |
| CN | 105159001 A | 12/2015 |
| CN | 105572983 A | 5/2016 |
| CN | 105629591 A | 6/2016 |
| CN | 106353930 A | 1/2017 |
| CN | 106444171 A | 2/2017 |
| CN | 106526937 A | 3/2017 |
| CN | 107255879 A | 10/2017 |
| CN | 107272271 A | 10/2017 |
| CN | 107589587 A | 1/2018 |
| CN | 108828822 A | 11/2018 |
| CN | 109298570 A | 2/2019 |
| CN | 106444171 B | 6/2019 |
| CN | 110082967 A | 8/2019 |
| CN | 110133920 A | 8/2019 |
| CN | 110297364 A | 10/2019 |
| CN | 110764318 A | 2/2020 |
| CN | 111308797 A | 6/2020 |
| CN | 111505870 A | 8/2020 |
| CN | 211741794 U | 10/2020 |
| CN | 214375724 U | 10/2021 |
| KR | 10-2007-0020868 A | 2/2007 |
| KR | 10-2012-0107269 A | 10/2012 |
| KR | 20150026586 A | 3/2015 |
| KR | 10-2015-0078170 A | 7/2015 |
| WO | 2021/168683 A1 | 9/2021 |

OTHER PUBLICATIONS

Written Opinion of the International Searching Authority in Chinese in PCT/CN2022/071870, mailed Mar. 22, 2022 with English translation.
Partial European Search Report in European Application No. 22739099.4 dated Nov. 27, 2023.
Office Action in U.S. Appl. No. 17/907,986 dated Oct. 11, 2023.
Extended European Search Report in European Application No. 21935493.3 dated Jan. 2, 2024.
Indian First Office Action in Indian Patent Application No. 202227043318 dated Feb. 22, 2024 with English translation.
Office Action in U.S. Appl. No. 17/764,734 dated Sep. 29, 2023.
Office Action in U.S. Appl. No. 17/639,030 dated Apr. 15, 2024.
Office Action in U.S. Appl. No. 17/764,734 dated Jan. 8, 2024.
Notice of Allowance in U.S. Appl. No. 17/764,734 dated Apr. 22, 2024.

* cited by examiner

ELECTRODE STRUCTURE, DISPLAY PANEL, AND ELECTRONIC DEVICE

This patent application is a continuation of U.S. application Ser. No. 17/764,734, filed on Mar. 29, 2022, which is a national stage application of International Application NO. PCT/CN2022/071870 filed on Jan. 13, 2022, which claims the priority of Chinese patent application No. 202110041652.X filed on Jan. 13, 2021, the priority of PCT international application No. PCT/CN2021/083044 filed on Mar. 25, 2021, and the priority of PCT international application No. PCT/CN2021/085622 filed on Apr. 6, 2021, for all purposes, the content of which is incorporated in its entirety as portion of the present application by reference herein.

TECHNICAL FIELD

The embodiments of the present disclosure relate to the display technical field, in particular to an electrode structure, a display panel, and an electronic device.

BACKGROUND

With the continuous development of liquid crystal display panel, high-resolution products are constantly being developed, but with the increase of pixels, it is easy to cause a series of problems, for example, upon some pressure tests or drop tests being carried out on the liquid crystal display panel, it is easy to have uneven brightness problems such as bright spots and snowflakes. In addition, the electrode structure in the liquid crystal display panel is easily influenced by the impurity particles in the manufacturing process, and it is easy to form bad situations such as broken wires, which leads to pixel failure, thus reducing the yield of the liquid crystal display panel and affecting the reliability and product quality of the liquid crystal display panel.

SUMMARY

The embodiments of the present disclosure provide an electrode structure, a display panel and an electronic device. By designing a first electrode portion and a second electrode portion of the electrode structure to have a semi-open first slit and a semi-open second slit respectively, liquid crystal molecules can deflect at the openings of the first slit and the second slit; besides, the first slit and the second slit are in semi-open state, so that the light efficiency around the electrode structure can be improved, and at least one or more problems caused by the limitations and defects of related technologies can be overcame to some extent.

At least one embodiment of the present disclosure provides a display panel, and the display panel comprises an array substrate and an opposite substrate which are cell-assembled, in which the array substrate comprises a first substrate, and a scanning line, a data line, a first barrier wall and a second barrier wall which are formed at a side of the first substrate close to the opposite substrate; the data line extends in a first direction, the scanning line extends in a second direction, and the first direction intersects with the second direction; the first barrier wall and the second barrier wall are located at opposite sides of the scanning line in the first direction, respectively, and each of the first barrier wall and the second barrier wall comprises a first barrier layer which is arranged in the same layer as the scanning line and spaced apart from the scanning line, and a second barrier layer which arranged in the same layer as the data line and spaced apart from the data line; an orthographic projection of the second barrier layer on the first substrate overlaps with an orthographic projection of the first barrier layer on the first substrate; a distance between the first barrier layer and the scanning line in the first direction is a first distance, and a distance between the second barrier layer and the scanning line in the first direction is a second distance, the second distance is larger than the first distance, the opposite substrate comprises a second substrate and a spacer located at a side of the second substrate close to the array substrate, a surface of the spacer close to the first substrate is a top surface, and an orthographic projection of the top surface of the spacer is located within an orthographic projection of the scanning line on the first substrate, and located between the orthographic projection of the first barrier wall on the first substrate and the orthographic projection of the second barrier wall on the first substrate; and a size of the top surface of the spacer in the first direction is larger than the first distance.

For example, in the display panel provided by at least one embodiment of the present disclosure, a ratio between the size of the top surface of the spacer in the first direction and the first distance is greater than or equal to 2.

For example, in the display panel provided by at least one embodiment of the present disclosure, a distance between the second barrier layer and the spacer in the first direction is a third distance, and a ratio of the third distance and the size of the top surface of the spacer in the first direction is larger than or equal to 0.5.

For example, in the display panel provided by at least one embodiment of the present disclosure, the ratio of the third distance and the size of the top surface of the spacer in the first direction is larger than or equal to 1.

For example, in the display panel provided by at least one embodiment of the present disclosure, a ratio between the third distance and a size of the data line in the second direction ranges from 2 to 4.

For example, in the display panel provided by at least one embodiment of the present disclosure, the orthographic projection of the second barrier layer on the first substrate is located within the orthographic projection of the first barrier layer on the first substrate, and the first direction is perpendicular to the second direction.

For example, in the display panel provided by at least one embodiment of the present disclosure, the array substrate further comprises a first common line formed on the first substrate and extending in the second direction, the first common line is arranged in the same layer as the scanning line and spaced apart from the scanning line; and the first barrier layer of the second barrier wall is a part of the first common line.

For example, in the display panel provided by at least one embodiment of the present disclosure, the array substrate further comprises a plurality of sub-pixel units arranged in an array on the first substrate along the second direction and the first direction; each of the plurality of sub-pixel units comprises a pixel electrode, a common electrode and a transistor; the transistor comprises a gate electrode, a first electrode and a second electrode; the gate electrode is connected with the scanning line; the first electrode is connected with the pixel electrode, the second electrode is connected with the data line; an orthographic projection of the common electrode on the first substrate overlaps with an orthographic projection of the pixel electrode on the first substrate, and the common electrode is connected with the first common line.

For example, in the display panel provided by at least one embodiment of the present disclosure, the pixel electrode is located at a side of the common electrode away from the first substrate, and the pixel electrode comprises: a first electrode portion comprising a first connection bar extending in the first direction and a plurality of first electrode strips arranged at intervals in the first direction, wherein the first connection bar comprises a first side and a second side opposite to each other in the second direction, the plurality of first electrode strips are located at the first side of the first connection bar and connected with the first connection bar, and ends of adjacent first electrode strips away from the first connection bar are open; a second electrode portion spaced apart from the first electrode portion in the first direction, wherein the second electrode portion comprises a second connection bar extending in the first direction and a plurality of second electrode strips spaced apart in the first direction, the second connection bar is located at a position of the first side away from the second side, and the second connection bar comprises a third side and a fourth side opposite to each other in the second direction, and the third side is located at a position of the fourth side close to the first side; the plurality of second electrode strips are located at the third side of the second connection bar and connected with the second connection bar, and ends of adjacent second electrode strips away from the second connection bar are open; and a conductive connection portion located between the first electrode portion and the second electrode portion, and two ends of the conductive connection portion are respectively connected with the first connection bar and the second connection bar; and an area of the conductive connection portion is larger than an area of each of the first electrode strips and an area of each of the second electrode strips.

For example, in the display panel provided by at least one embodiment of the present disclosure, the conductive connection portion comprises a first conductive connection bar and a second conductive connection bar which are arranged at intervals in the second direction and both extend in the first direction, and at least two third conductive connection bars located between the first conductive connection bar and the second conductive connection bar and arranged at intervals in the first direction, and two ends of each of the third conductive connection bars are connected with the first conductive connection bar and the second conductive connection bar, respectively, and the first conductive connection bar is connected with the first connection bar, and the second conductive connection bar is connected with the second connection bar.

For example, in the display panel provided by at least one embodiment of the present disclosure, the first electrode strips, the second electrode strips and the third conductive connection bars all extend in the third direction, and a first width of each of the first electrode strips, a first width of each of the second electrode strips and a first width of each of the third electrode strips are equal, and the first width is a size in a fourth direction, the third direction is perpendicular to the fourth direction, and the third direction intersects the first direction and the second direction.

For example, in the display panel provided by at least one embodiment of the present disclosure, the array substrate further comprises a second common line which is arranged in the same layer as the data line and spaced apart from the data line, the second common line extends in the first direction, and two ends of the second common line are connected with common electrodes of two adjacent sub-pixel units through a first via hole structure, respectively.

For example, in the display panel provided by at least one embodiment of the present disclosure, the first via hole structure comprises a first via hole portion, a second via hole portion and a via hole connection portion, the via hole connection portion and the pixel electrode are arranged in the same layer and spaced apart from each other, and the via hole connection portion is connected with the second common line through the first via hole portion, and the via hole connection portion is connected with the common electrode through the second via hole portion.

At least one embodiment of the present disclosure further provides an electronic device, and the electronic device comprises any one of the display panels mentioned above.

At least one embodiment of the present disclosure further provides an electrode structure, and the electrode structure comprises a first electrode portion and a second electrode portion arranged at intervals in a first direction, and a conductive connection portion located between the first electrode portion and the second electrode portion, in which the first electrode portion comprises a first connection bar extending in the first direction and a plurality of first electrode strips arranged at intervals in the first direction, the first connection bar has a first side and a second side opposite to each other in the second direction, the plurality of first electrode strips are located at the first side of the first connection bar and connected with the first connection bar, and ends of adjacent first electrode strips away from the first connection bar are open; the second electrode portion comprises a second connection bar extending in the first direction and a plurality of second electrode strips arranged at intervals in the first direction, and the second connection bar is located at a position of the first side away from the second side, the second connection bar comprises a third side and a fourth side which are opposite to each other in the second direction, the third side is located at a position of the fourth side close to the first side; the plurality of second electrode strips are located at the third side of the second connection bar and connected with the second connection bar, and ends of adjacent second electrode strips away from the second connection bar are open; two ends of the conductive connection portion are connected with the first connection bar and the second connection bar, respectively.

For example, in the electrode structure provided by at least one embodiment of the present disclosure, an area of the conductive connection portion is larger than an area of each of the first electrode strips, and is larger than an area of each of the second electrode strips.

For example, in the electrode structure provided by at least one embodiment of the present disclosure, the area of the first electrode portion and the area of the second electrode portion are both larger than the area of the conductive connection portion.

For example, in the electrode structure provided by at least one embodiment of the present disclosure, the conductive connection portion comprises a first conductive connection bar and a second conductive connection bar which are arranged at intervals in the second direction and both extend in the first direction, and at least two third conductive connection bars located between the first conductive connection bar and the second conductive connection bar and arranged at intervals in the first direction, two ends of each of the third conductive connection bars are connected with the first conductive connection bar and the second conductive connection bar, respectively; and the first conductive connection bar is connected with the first connection bar, and the second conductive connection bar is connected with the second connection bar.

For example, in the electrode structure provided by at least one embodiment of the present disclosure, the first electrode strips, the second electrode strips and the third conductive connection bars all extend in a third direction, and first widths of each of the first electrode strips, each of the second electrode strips and each of the third electrode strips in a fourth direction are equal, and the third direction is perpendicular to the fourth direction, and the third direction intersects the first direction and the second direction.

For example, in the electrode structure provided by at least one embodiment of the present disclosure, the ends of the adjacent first electrode strips away from the first connection strip are not connected to each other; the ends of the adjacent second electrode strips away from the second connection strip are not connected to each other.

For example, in the electrode structure provided by at least one embodiment of the present disclosure, a first slit is provided between adjacent first electrode strips, the plurality of first electrode strips and the first slit extend in the same direction, and the first slit is semi-open; a second slit is provided between adjacent second electrode strips, the plurality of second electrode strips and the second slit extend in the same direction, and the second slit is semi-open; an opening direction of the first slit and an opening direction of the second slit are opposite to each other.

For example, in the electrode structure provided by at least one embodiment of the present disclosure, a first width of each of the first electrode strips in the fourth direction and a first width of each of the second electrode strips in the fourth direction are equal, and a first width of the first slit in the fourth direction and a first width of the second slit in the fourth direction are equal.

For example, in the electrode structure provided by at least one embodiment of the present disclosure, the first width of the first slit in the fourth direction is 1 to 4 times of the first width of the first electrode strip in the fourth direction.

For example, in the electrode structure provided by at least one embodiment of the present disclosure, the first width of each of the first electrode strips in the fourth direction and the first width of each of the second electrode strips in the fourth direction both ranges from 1.8 μm to 3 μm; the first width of the first slit in the fourth direction and the first width of the second slit in the fourth direction both ranges from 3 μm to 7 μm.

For example, in the electrode structure provided by at least one embodiment of the present disclosure, a third slit is provided between adjacent third conductive connection bars, and the third slit is closed.

For example, in the electrode structure provided by at least one embodiment of the present disclosure, the conductive connection portion comprises a plurality of the third slits.

For example, in the electrode structure provided by at least one embodiment of the present disclosure, the first width of the third conductive connection bar in the fourth direction is equal to the first width of each of the first electrode strips in the fourth direction, and the first width of the third slit, the first width of the first slit, and the first width of the second slit are equal.

For example, in the electrode structure provided by at least one embodiment of the present disclosure, a fourth slit is provided between the third conductive connection bar and a first electrode strip adjacent to the third conductive connection bar, and a fifth slit is provided between the third conductive connection bar and a second electrode strip adjacent to the third conductive connection bar; the first width of the first slit in the fourth direction, the first width of the second slit in the fourth direction, the first width of the third slit in the fourth direction, the first width of the fourth slit in the fourth direction, and the first width of the fifth slit in the fourth direction are equal.

For example, in the electrode structure provided by at least one embodiment of the present disclosure, the first width of each of the first electrode strips in the fourth direction and the first width of each of the second electrode strips in the fourth direction are smaller than the first width of an entirety of the conductive connection portion in the fourth direction.

For example, in the electrode structure provided by at least one embodiment of the present disclosure, a second width of the first connection bar in the second direction is equal to a second width of the second connection bar in the second direction; the second width of the first connection bar in the second direction and the second width of the second connection bar in the second direction are greater than or equal to the first width of each of the first electrode strips in the fourth direction and the first width of each of the second electrode strips in the fourth direction.

For example, in the electrode structure provided by at least one embodiment of the present disclosure, a length of the first conductive connection bar in the first direction and a length of the second conductive connection bar in the first direction are both shorter than a length of the first connection bar in the first direction and a length of the second connection bar in the first direction.

For example, in the electrode structure provided by at least one embodiment of the present disclosure, the length of the first connection bar in the first direction is smaller than the length of the second connection bar in the first direction.

For example, in the electrode structure provided by at least one embodiment of the present disclosure, a ratio of the length of the first connection bar in the first direction to the length of the second connection bar in the first direction ranges from 0.1 to 0.9.

For example, in the electrode structure provided by at least one embodiment of the present disclosure, an entity of the first connection bar, the conductive connection portion and the second connection bar is in a folded line shape, one end of the first connection bar is connected with one end of the conductive connection portion, another end of the conductive connection portion is connected with an end of the second connection bar, and the first connection bar and the second connection bar are located at different sides of the conductive connection portion in the second direction.

For example, in the electrode structure provided by at least one embodiment of the present disclosure, the second width of the first conductive connection bar in the second direction is equal to the second width of the first connection bar in the second direction, and the second width of the second conductive connection bar in the second direction is equal to the second width of the second connection bar in the second direction.

For example, in the electrode structure provided by at least one embodiment of the present disclosure, the conductive connection portion comprises a conductive connection bar, the conductive connection bar extends in a third direction, and the third direction intersects the first direction and the second direction.

For example, in the electrode structure provided by at least one embodiment of the present disclosure, the third direction is perpendicular to a fourth direction, and a ratio of the first width of the conductive connection bar in the fourth direction to the first width of each of the first electrode strips in the fourth direction ranges from 1.5 to 5.5.

For example, in the electrode structure provided by at least one embodiment of the present disclosure, the first width of the conductive connection bar in the fourth direction ranges from 5 μm to 10 μm, and the first width of the first electrode strip in the fourth direction ranges from 1.8 μm to 3 μm.

For example, in the electrode structure provided by at least one embodiment of the present disclosure, the second width of the first connection bar in the second direction and the second width of the second connection bar in the second direction both range from 2.3 μm to 2.7 μm, and the first width of the conductive connection bar in the fourth direction ranges from 2.5 μm to 3.0 μm, the first width of each of the first electrode strips in the fourth direction and the first width of each of the second electrode strips in the fourth direction both range from 1.8 μm to 2.6 μm.

For example, in the electrode structure provided by at least one embodiment of the present disclosure, the second electrode portion further comprises a signal connection portion, the signal connection portion is located at a side of the plurality of second electrode strips away from the conductive connection portion and is connected with the second connection strip.

For example, in the electrode structure provided by at least one embodiment of the present disclosure, the first connection bar and the second electrode strip are arranged in mirror symmetry with respect to the second direction.

BRIEF DESCRIPTION OF THE DRAWINGS

In order to more clearly explain the technical scheme of the embodiments of the present disclosure, the following will briefly introduce the drawings of the embodiments. Obviously, the drawings in the following description only relate to some embodiments of the present disclosure, but not limit the present disclosure.

REFERENCE NUMERALS IN FIG. 1

Figure 1:
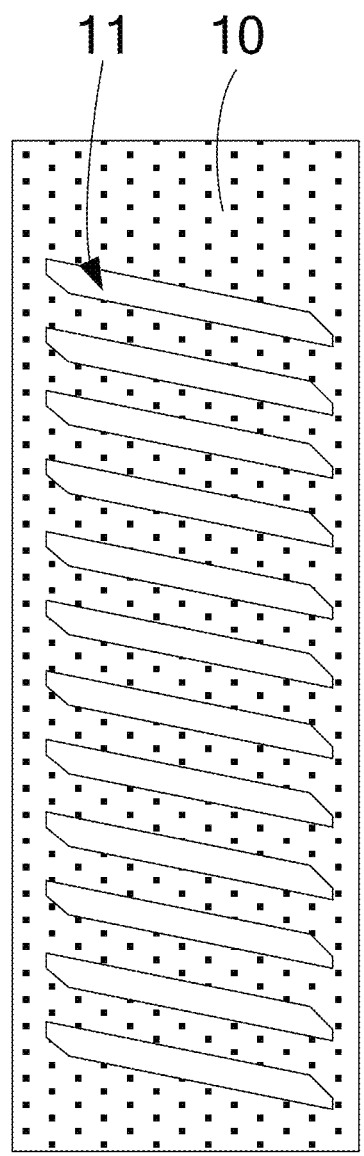
FIG. 1 is a schematic plan view of an electrode structure.

10—slit electrode; 11—slit;

REFERENCE NUMERALS IN FIGS. 2 TO 8

20—first electrode portion; 201—first connection bar; 201a—first side; 201b—second side; 202—first electrode strip; 21—second electrode portion; 211—second connection bar; 211a—third side; 211b—fourth side; 212—second electrode strip; 213—signal connection portion; 22—conductive connection portion; 211—first conductive connection bar; 222—second conductive connection bar; 223—third conductive connection bar; 3—array substrate; 30—first substrate; 301—sub-pixel region; 302—first wiring region; 303—second wiring region; 31—scanning line; 32—first common line; 33—data line; 34—pixel electrode; 35—common electrode; 36—transistor; 360—active layer; 361—gate electrode; 362—first electrode; 363—second electrode; 37—second common line; 38a—first barrier wall; 38b—second barrier wall; 381—first barrier layer; 382—second barrier layer;

4—opposite substrate; 40—shielding layer; 41—second substrate; 42—spacer;

5—liquid crystal molecule.

DETAILED DESCRIPTION

In order to make objects, technical details and advantages of embodiments of the present disclosure clear, the technical solutions of the embodiments of the present disclosure will be described in a clearly and fully understandable way in connection with the related drawings of the embodiments of the present disclosure. It is apparent that the described embodiments are just a part but not all of the embodiments of the present disclosure. Based on the described embodiments of the present disclosure, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects.

Thin film transistor-liquid crystal display (TFT-LCD) technology is a clever combination of microelectronic technology and liquid crystal display technology. Technicians in the field use the micro-electronic fine processing technology on silicon substrate (Si), then transplant the micro-electronic fine processing technology to a large-area glass to form a thin film transistor (TFT) array, so as to from an array substrate, and then use mature liquid crystal display (LCD) technology to cell-assemble the array substrate with another substrate with a color film layer (i.e., an opposite substrate) to form a liquid crystal cell, and finally form a liquid crystal display panel through subsequent processes, such as a process of attaching a polarizer.

It should be understood that the liquid crystal cell also includes a photo spacer (PS), which is mainly used to support the liquid crystal cell, maintain the cell thickness in all regions of the liquid crystal display panel consistent, and ensure the brightness uniformity of the display panel. However, with regard to a horizontal electric field deflection product, such as an ADS (Advanced Super Dimension Switching) product or an IPS (In-Plane Switching) product, upon the display panel being subjected to an external stress, the spacer will move; if the movement of the spacer is large, the spacer may scratch an alignment film (i.e., PI film) on a slit electrode (an electrode structure with slits), thereby causing the alignment failure of liquid crystals in this region, resulting in light leakage upon the display panel working, thus forming irregular bright spots on the macro level, and further affecting the quality of products.

For example, FIG. 1 is a schematic plan view of an electrode structure. As illustrated by FIG. 1, a graphic design of the electrode structure 10 of the liquid crystal display panel is that a slit 11 is provided inside the electrode structure 10, and the slit 11 is peripherally closed, but the light efficiency around the slit electrode 10 is poor, which easily leads to the problem of poor display.

An embodiment of the present disclosure provides an electrode structure, by designing the first electrode portion and the second electrode portion to have a semi-open first slit and a semi-open second slit, respectively, the electrode structure allows liquid crystal molecules to deflect at openings of the first slit and the second slit, and the first slit and the second slit are in a semi-open state, and the light efficiency around the electrode structure can be improved, so that at least one or more problems caused by the limitations and defects of related technologies can be overcame to some extent. The electrode structure can be used in a liquid crystal display panel, and can be used as a pixel electrode or a common electrode of the liquid crystal display panel. In one example, a material of the electrode structure is indium tin oxide, that is, the electrode structure can be an ITO (Indium Tin Oxide) electrode, and the electrode structure has light transmitting performance.

Figure 2:
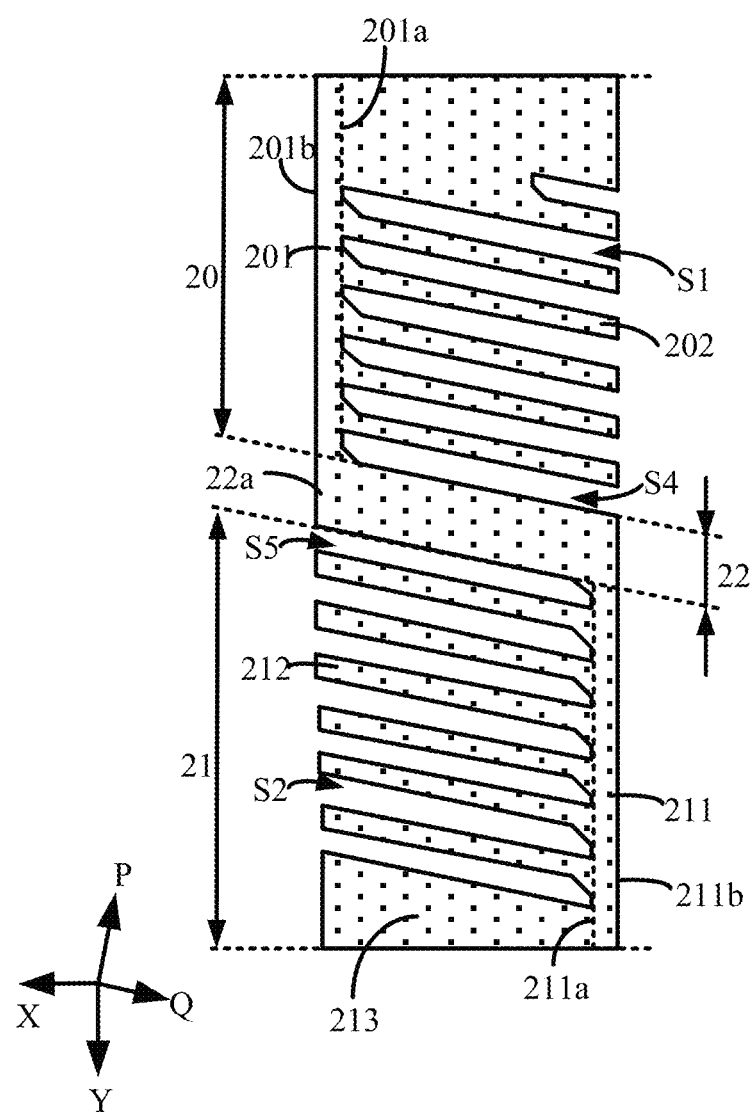
FIG. 2 is a schematic plan view of an electrode structure provided by an embodiment of the present disclosure.

For example, FIG. 2 is a schematic plan view of an electrode structure provided by an embodiment of the present disclosure. As illustrated by FIG. 2, the electrode structure includes a first electrode portion 20, a conductive connection portion 22 and a second electrode portion 21 which are sequentially arranged in a first direction Y. The first electrode portion 20 may include a first connection bar 201 extending in the first direction Y and a plurality of first electrode strips 202 arranged at intervals in the first direction Y. The first connection bar 201 includes a first side 201a and a second side 201b opposite to each other in the second direction X. The plurality of first electrode strips 202 are located at the first side 201a of the first connection bar 201 and connected with the first connection bar 201, and ends of adjacent first electrode strips 202 away from the first connection bar 201 are open, that is, the ends of adjacent first electrode strips 202 away from the first connection bar 201 are not connected with each other.

It should be noted that the plurality of first electrode strips 202 as mentioned above are arranged at intervals in the first direction Y, that is, a first slit S1 is formed between adjacent first electrode strips 202, and the first slit S1 is semi-open.

For example, as illustrated by FIG. 2, the second electrode portion 21 includes a second connection bar 211 extending in the first direction Y and a plurality of second electrode strips 212 arranged at intervals in the first direction Y. The second connection bar 211 is located at a position of the first side 201a away from the second side 201b, and the second connection bar 211 has a third side 211a and a fourth side 211b opposite to each other in the second direction X, and the third side 211a is located at a position of the fourth side 211b close to the first side 201a. It should be noted that, the second direction X is perpendicular to the first direction Y; the plurality of second electrode strips 212 are located at the third side 211a of the second connection bar 211 and connected with the second connection bar 211, and ends of adjacent second electrode strips 212 away from the second connection bar 211 are open, that is, the ends of adjacent second electrode strips 212 away from the second connection bar 211 are not connected with each other.

It should be noted that the plurality of second electrode strips 212 as mentioned above are arranged at intervals in the first direction Y, that is, a second slit S2 is provided between adjacent second electrode strips 212, and the second slit S2 is semi-open.

For example, as illustrated by FIG. 2, the conductive connection portion 22 is located between the first electrode portion 20 and the second electrode portion 21, and two ends of the conductive connection portion 22 are respectively connected with the first connection bar 201 and the second connection bar 211.

For example, in the embodiment of the present disclosure, the first electrode portion 20 and the second electrode portion 21 of the electrode structure are respectively designed to include the first slit S1 and the second slit S2 which are semi-open, so that the liquid crystal molecules can deflect at the openings of the first slit S1 and the second slit S2. Thus, the light efficiency around the electrode structure can be improved compared with the electrode structure shown in FIG. 1, in which the slit is peripherally closed.

In addition, as illustrated by FIG. 2, an opening direction of one of the first slit S1 of the first electrode portion 20 and the second slit S2 of the second electrode portion 21 is toward the right, and the opening direction of the other of the first slit S1 of the first electrode portion 20 and the second slit S2 of the second electrode portion 21 is toward the left, that is, the opening directions of the first slit S1 of the first electrode portion 20 and the second slit S2 of the second electrode portion 21 are opposite, so that the light efficiency of the electrode structure in the second direction X (i.e., the left and right sides in FIG. 2) can be balanced, so that light efficiency around the electrode structure is more uniform, so as to improve the display effect.

For example, in one example, orthographic projections of the first electrode portion 20, the second electrode portion 21 and the conductive connection portion 22 on a reference plane coincide with each other, and the "coincidence" mentioned here refers to complete coincidence within a range allowed by the error, so that the design difficulty of the electrode structure can be reduced, thus facilitating the arrangement of multiple electrode structures in the array substrate, but the embodiment of the present disclosure is not limited thereto, and the orthographic projections of the first electrode portion 20, the second electrode portion 21 and the conductive connection portion 22 on the reference plane may not coincide with each other, which depends on the specific situation.

It should be noted that the reference plane mentioned in the embodiment of the present disclosure is a plane perpendicular to the first direction Y.

For example, in one example, the first electrode strip 202 and the second electrode strip 212 mentioned above can be parallel to each other, that is, extending directions of the first electrode strip 202 and the second electrode strip 212 are parallel to each other, so as to balance the light efficiency at the first electrode portion 20 and the second electrode portion 21. Specifically, both the first electrode strip 202 and the second electrode strip 212 extend in a third direction Q, which intersects with the first direction Y and the second direction X. That is to say, the third direction Q is not parallel or collinear with the first direction Y and the second direction X. This design can reduce the color cast and improve the display effect of the display panel upon the electrode structure being used in the display panel.

For example, in one example, an acute angle between the third direction Q and the second direction X can be 5 to 15 degrees, such as 5 degrees, 7 degrees, 9 degrees, 11 degrees, 13 degrees, 15 degrees, etc., which is not limited by the embodiments of the present disclosure.

For example, in one example, a first width of the first electrode strip 202 can be equal to a first width of the second electrode strip 212. In addition, a first width of the first slit S1 can be equal to a first width of the second slit S2, so that the light efficiency at the first electrode portion 20 and the light efficiency at the second electrode portion 21 can be further balanced to improve the display effect of the display panel upon the electrode structure being used in the display panel.

It should be noted that the first width mentioned in the embodiment of the present disclosure refers to a size in the fourth direction P, which is perpendicular to the third direction Q.

For example, in one example, in order to ensure good deflection of liquid crystal molecules at the first electrode portion 20 and the second electrode portion 21 to improve the light efficiency at the first electrode portion 20 and the second electrode portion 21, the first width of the first electrode strip 202 in the fourth direction P, the first width of the first slit S1 in the fourth direction P, the first width of the second electrode strip 212 in the fourth direction P and the first width of the second slit S2 in the fourth direction P need to meet certain requirements, that is, a ratio of the first width of the first slit S1 in the fourth direction P to the first width of the first electrode strip 202 in the fourth direction P can be 1 to 4, such as 1, 1.5, 2, 2.5, 3, 3.5, and 4, and the embodiments of the present disclosure are not limited thereto.

For example, in one example, the first widths of the first electrode strips 202 and the second electrode strips 212 in the fourth direction P can be 1.8 µm to 3 µm, such as 1.8 µm, 2 µm, 2.2 µm, 2.4 µm, 2.6 µm, 2.8 µm, 3 µm, etc. The first width of the first slit S1 and the second slit S2 in the fourth direction P can be 3 µm to 7 µm, such as 3 µm, 3.5 µm, 4 µm, 4.5 µm, 5 µm, 5.5 µm, 6 µm, 6.5 µm, 7 µm, etc.

In addition, in order to further balance the light efficiencies at the first electrode portion 20 and the second electrode portion 21 and improve the display effect of the display panel upon the electrode structure being used in the display panel, a second width of the first connection bar 201 in the second direction X and a second width of the second connection bar 211 in the second direction X can be set equal. For example, the second widths of the first connection bar 201 and the second connection bar 211 in the second direction X can be equal to the first widths of the first electrode strip 202 and the second electrode strip 212 in the fourth direction P, but the embodiment of the present disclosure is not limited thereto, and the second widths of the first connection bar 201 and the second connection bar 211 in the second direction X can be slightly larger than the first widths of the first electrode strip 202 and the second electrode strip 212 in the fourth direction P, so as to improve the light efficiency and ameliorate the problem that the first connection bar 201 and the second connection bar 211 are easily broken due to the small first width of the first connection bar 201 and the second connection bar 211 in the fourth direction P at the same time, so as to improve the yield of the finally formed display panel.

It should be noted that the second width mentioned in the embodiment of the present disclosure is a size in the second direction X.

For example, the first electrode portion 20 and the second electrode portion 21 of the aforementioned electrode structure are connected by the conductive connection portion 22. In order to avoid the problem that the conductive connection portion 22 is broken due to the influence of foreign particles in the manufacturing process, the area of the conductive connection portion 22 is designed to be relatively large in the embodiment of the present disclosure, so as to avoid the situation that the conductive connection portion 22 is easily broken and causes pixel failure. For example, in one example, the area of the conductive connection portion 22 is larger than the area of the first electrode strip 202 and larger than the area of the second electrode strip 212.

It should be understood that the entire conductive connection portion 22 can also extend in the third direction Q, so as to reduce the difficulty of processing and design. For example, upon the orthographic projection of the conductive connection portion 22 on the reference plane coincides with the orthographic projections of the first electrode portion 20 and the second electrode portion 21 on the reference plane, in order to make the area of the conductive connection portion 22 larger than the area of the first electrode strip 202 and the second electrode strip 212, in one example, the first width of the first electrode strip 202 in the fourth direction P and the first width of the second electrode strip 212 in the fourth direction P can be smaller than the first width of the entirety of the conductive connection portion 22 in the fourth direction P.

For example, in an example, as illustrated by FIG. 2, the conductive connection portion 22 can be a conductive connection bar 22a extending in the third direction Q, a ratio of the first width of the conductive connection bar 22a in the fourth direction P to the first width of the first electrode strip 202 in the fourth direction P can range from 1.5 to 5.5, that is, the conductive connection portion 22 is widened compared with the first electrode strip 202, so as to ameliorate the problem that the conductive connection portion 22 is easily broken, so as to guarantee the quality of the finally formed display panel.

For example, in one example, in the case where the conductive connection portion 22 is only one conductive connection bar 22a, the first width of the conductive connection bar 22a in the fourth direction P may range from 5 µm to 10 µm, such as 5 µm, 6 µm, 7 µm, 8 µm, 9 µm, 10 µm, etc.

For example, in one example, the second width of the first connection bar 201 in the second direction X and the second width of the second connection bar 211 in the second direction X both range from 2.3 µm to 2.7 µm, the first width of the conductive connection bar 22a in the fourth direction P ranges from 2.5 µm to 3.0 µm, and the first widths of the first electrode strip 202 and the second electrode strip 212 in the fourth direction P both range from 1.8 µm to 2.6 µm.

For example, in one example, the first connection bar 201 and the second electrode strip 212 are arranged in mirror symmetry with respect to the second direction X, which can simplify the process for preparing the electrode structure.

Figure 3:
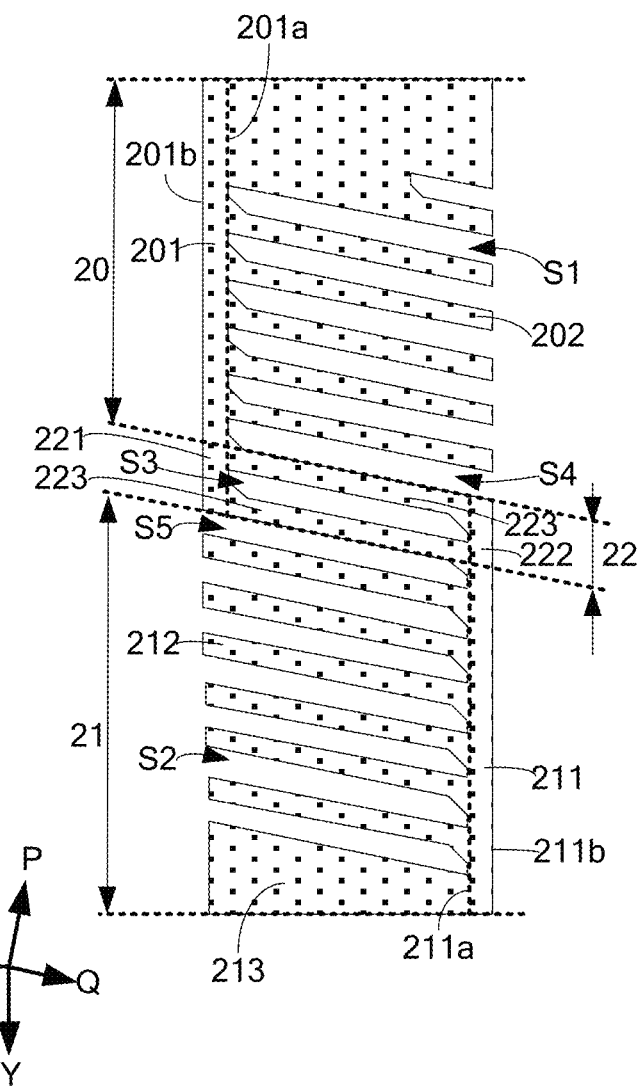
FIG. 3 is a schematic plan view of another electrode structure provided by an embodiment of the present disclosure.

For example, FIG. 3 is a schematic plan view of another electrode structure provided by an embodiment of the present disclosure. As illustrated by FIG. 3, the conductive connection portion 22 can include a first conductive connection bar 221, a second conductive connection bar 222 and at least two third conductive connection bars 223, both the first conductive connection bar 221 and the second conductive connection bar 222 extend in the first direction Y, and the first conductive connection bar 221 and the second conductive connection bar 222 are arranged at intervals in the second direction X. The first conductive connection bar 221 is connected with the first connection bar 201 and the second conductive connection bar 222 is connected with the second connection bar 211. At least two third conductive connection bars 223 are arranged at intervals in the first direction Y and located between the first conductive connection bar 221 and the second conductive connection bar 222, and two ends of each third conductive connection bar 223 (i.e., two ends in the extending direction of the third conductive connection bar) are respectively connected with the first conductive connection bar 221 and the second conductive connection bar 222, that is, a third slit S3 is provided between adjacent third conductive connection bars 223, and the third slit S3 is peripherally closed. For example, the number of the third slit S3 included in the conductive connection portion 22 is not limited, and the conductive connection portion 22 may also include a plurality of third slits S3.

For example, as illustrated by FIG. 3, by designing a slit (i.e., the third slit S3) in the conductive connection portion 22, on the one hand, the light efficiency loss above the conductive connection portion 22 can be reduced, thereby improving the light efficiency of the whole electrode structure; on the other hand, the first electrode portion 20 and the second electrode portion 21 can be connected and conducted through at least two wires (i.e., the third conductive connection bar 223), so that even if one of the wires is broken caused by impurity particles. There are still other wires connected to conduct the first electrode portion 20 and the second electrode portion 21, so that the incidence of pixel failure can be greatly reduced, that is, the yield of the display panel formed subsequently can be improved.

For example, in one example, two third conductive connection bars 223 are arranged, while ensuring the stable connection between the first electrode portion 20 and the second electrode portion 21, the proportion of the conductive connection portion 22 in the electrode structure can be appropriately reduced, that is, more design space can be provided for the first electrode portion 20 and the second electrode portion 21. In other words, the areas of the first electrode portion 20 and the second electrode portion 21 can both be larger than the area of the conductive connection portion 22. Because the first slit S1 in the first electrode portion 20 and the second slit S2 in the second electrode portion 21 are semi-open in design, while the third slit S3 in the conductive connection portion 22 is closed in design, the light efficiency at the first electrode portion 20 and the second electrode portion 21 is better than the light efficiency at the conductive connection portion 22, so that both the area of the first electrode portion 20 and the area of the second electrode portion 21 are larger than the area of the conductive connection portion 22, and the light efficiency of the whole electrode structure can be improved. Thus, the quality of the display panel can be improved when the electrode structure is used in the display panel. In addition, because the third slit S3 is formed in the conductive connection portion 22, the situation that the impurity particles are attached to the conductive connection portion 22 during the process for manufacturing the electrode structure can be alleviated, so that increase of the resistance value of the conductive connection portion 22 due to the attachment of the impurity particles can be alleviated, and then the influence on the driving of pixels can be alleviated.

It should be understood that the number of the third conductive connection bars 223 is not limited to two, but also can be three or four, which depends on the specific situation, which is not limited by the embodiment of the present disclosure.

For example, in order to further reduce the proportion of the conductive connection portion 22 in the electrode structure, a length of the first conductive connection bar 221 and a length of the second conductive connection bar 222 can be both smaller than a length of the first connection bar 201 and a length of the second connection bar 211. It should be understood that the length mentioned here is the size in the first direction Y.

For example, in one example, the length of the first connection bar 201 in the first direction Y is smaller than the length of the second connection bar 211 in the first direction Y.

For example, in one example, a ratio of the length of the first connection bar 201 in the first direction Y to the length of the second connection bar 211 in the first direction Y ranges from 0.1 to 0.9, for example, the ratio is 0.1, 0.2, 0.3, 0.4, 0.5, 0.6, 0.7, 0.8 or 0.9.

For example, as illustrated by FIG. 2 and FIG. 3, the first connection bar 201, the conductive connection portion 22 and the second connection bar 211 are integrally connected in a folded line shape, one end of the first connection bar 201 is connected with one end of the conductive connection portion 22, the other end of the conductive connection portion 22 is connected with one end of the second connection bar 211, and the first connection bar 201 and the second connection bar 211 are located on different sides of the conductive connection portion 22 in the second direction X.

For example, the second width of the first conductive connection bar 221 in the second direction X can be equal to the second width of the first connection bar 201 in the second direction X, and the second width of the second conductive connection bar 222 in the second direction X can be equal to the second width of the second connection bar 211 in the second direction X.

For example, as illustrated by FIG. 3, the third conductive connection bar 223 may also extend in the third direction Q. The first width of the third conductive connection bar 223 in the fourth direction P can be equal to the first width of the first electrode strip 202 in the fourth direction P. In addition, the first width in the fourth direction P of the third slit S3 between adjacent third conductive connection bars 223 can be equal to the first width in the fourth direction P of the first slit S1 between adjacent first electrode strips 202 and the first width in the fourth direction P of the second slit S2 between adjacent second electrode strips 212, so that the light efficiencies of the conductive connection portion 22, the first electrode portion 20 and the second electrode portion 21 can be balanced, so as to improve a display effect of the display panel upon the electrode structure being used in the display panel.

Further, a fourth slit S4 is provided between the third conductive connection bar 223 and the first electrode strip 202 which is adjacent to the third conductive connection bar 223, and a fifth slit S5 is provided between the third conductive connection bar 223 and the second electrode strip 212 which is adjacent to the third conductive connection bar 223. First widths of the fourth slit S4 and the fifth slit S5 in the fourth direction (P) are all equal to the first widths of the aforementioned first slit S1, second slit S2 and third slit S3 in the fourth direction (P), so as to balance the light efficiencies at the conductive connection portion 22, the first electrode portion 20, the second electrode portion 21 and positions between them, thereby improving the display effect of the display panel upon the electrode structure being used in the display panel.

In an embodiment of the present disclosure, as illustrated by FIGS. 2 and 3, the second electrode portion 21 may further include a signal connection portion 213, which can be located at a side of the plurality of second electrode strips 212 away from the conductive connection portion 22 and connected with the second connection strip 211. For example, in the case where the electrode structure in the embodiment of the present disclosure is a common electrode, the signal connection portion 213 can be connected with a common line in the array substrate, that is, the signal connection portion 213 can be used to receive a common signal, but the embodiment of the present disclosure is not limited thereto. In the case where the electrode structure in the embodiment of the present disclosure is a pixel electrode, the signal connection portion 213 can also be connected with a source electrode or a drain electrode of a transistor in the array substrate, and the signal connection portion 213 is used for receiving a signal transmitted from the source electrode or the drain electrode, such as a data signal.

It should be noted that, the dotted lines in FIG. 2 and FIG. 3 have no practical significance, but are only used to distinguish the aforementioned structures, so as to facilitate the understanding of the positional relationship among the aforementioned structures.

In addition, it should also be understood that the shape of the signal connection portion 213 is not limited to the shape shown in FIGS. 2 and 3, but can also have other shapes, which depends on the specific situation, and is not limited by the embodiment of the present disclosure. It should also be noted that the whole of the electrode structure mentioned in the embodiment of the present disclosure is an integrated structure.

Figure 4:
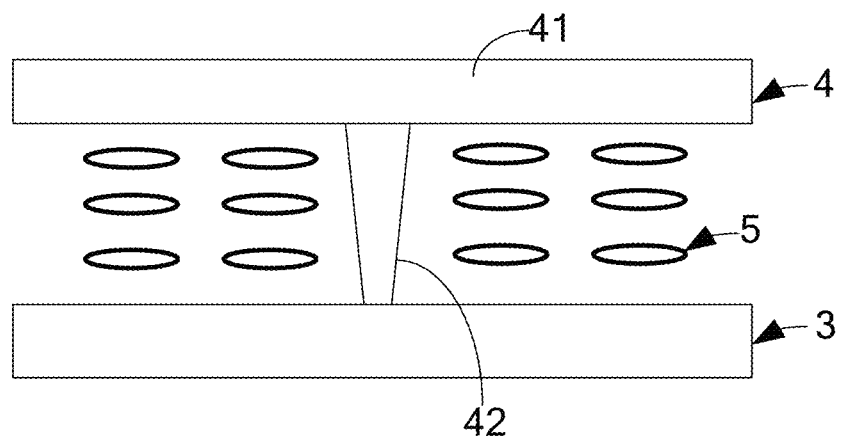
FIG. 4 is a schematic diagram of a partial cross-sectional structure of a display panel provided by an embodiment of the present disclosure.

An embodiment of the present disclosure further provides a display panel, which can be a liquid crystal display panel. For example, FIG. 4 is a schematic diagram of a partial cross-sectional structure of a display panel provided by an embodiment of the present disclosure. As illustrated by FIG. 4, the display panel may include an array substrate 3 and an opposite substrate 4 which are cell-assembled, and may also include liquid crystal molecules 5 located between the opposite substrate 4 and the array substrate 3.

Hereinafter, the display panel of the embodiment of the present disclosure will be described in detail with reference to FIGS. 2 to 8.

Figure 5:
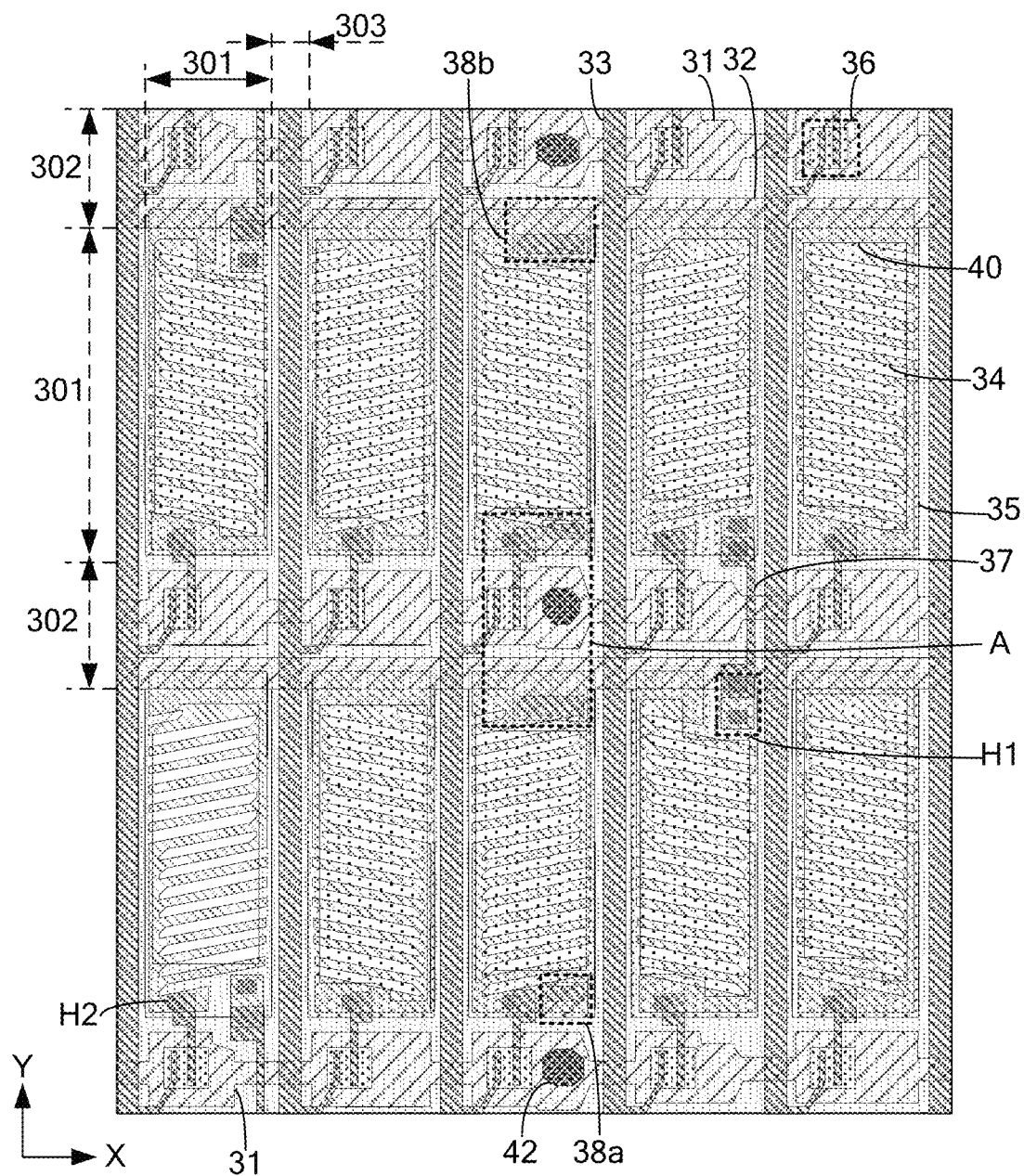
FIG. 5 is a schematic plan view of a display panel provided by an embodiment of the present disclosure.
Figure 6:
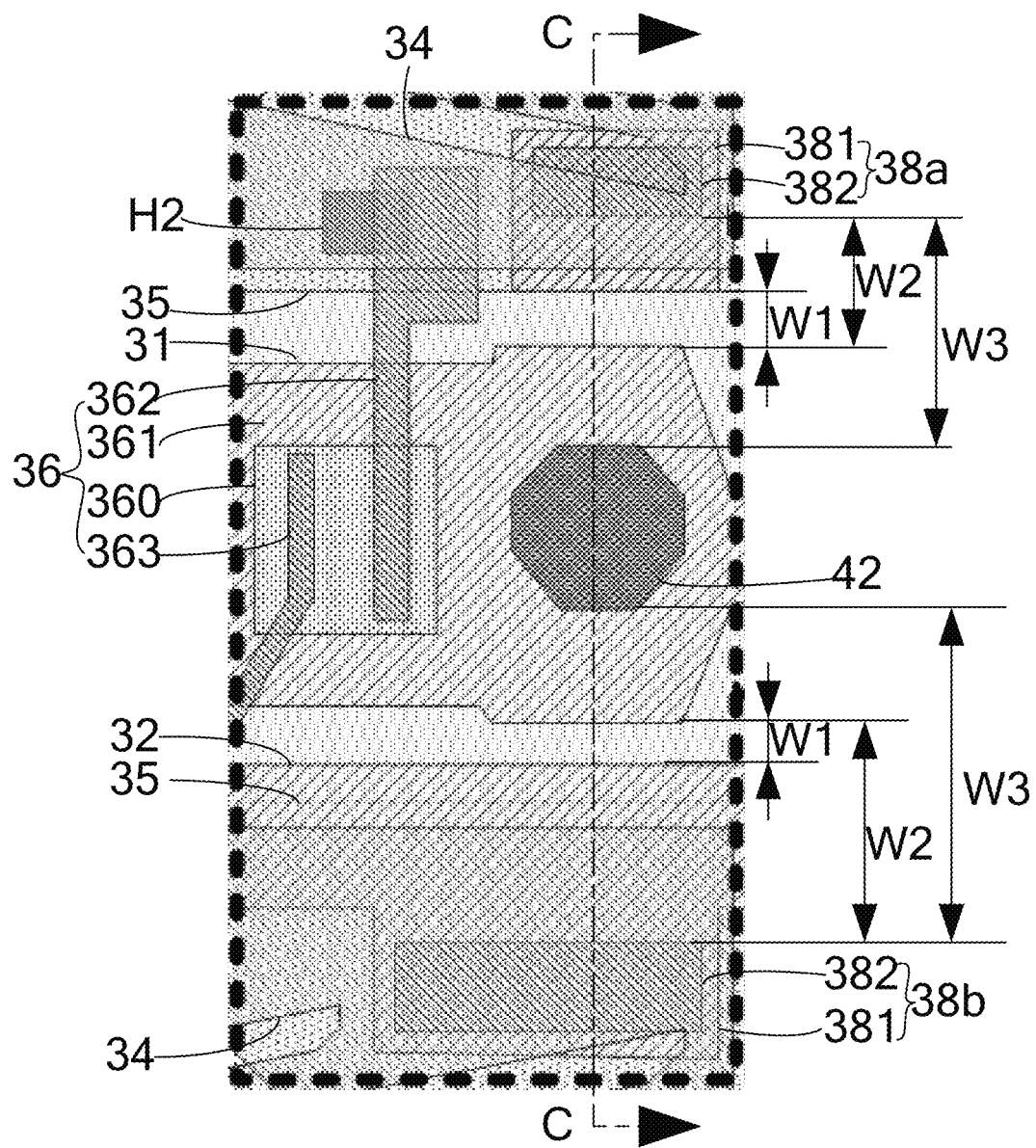
FIG. 6 is an enlarged structural diagram of part A shown in FIG. 5.
Figure 7:
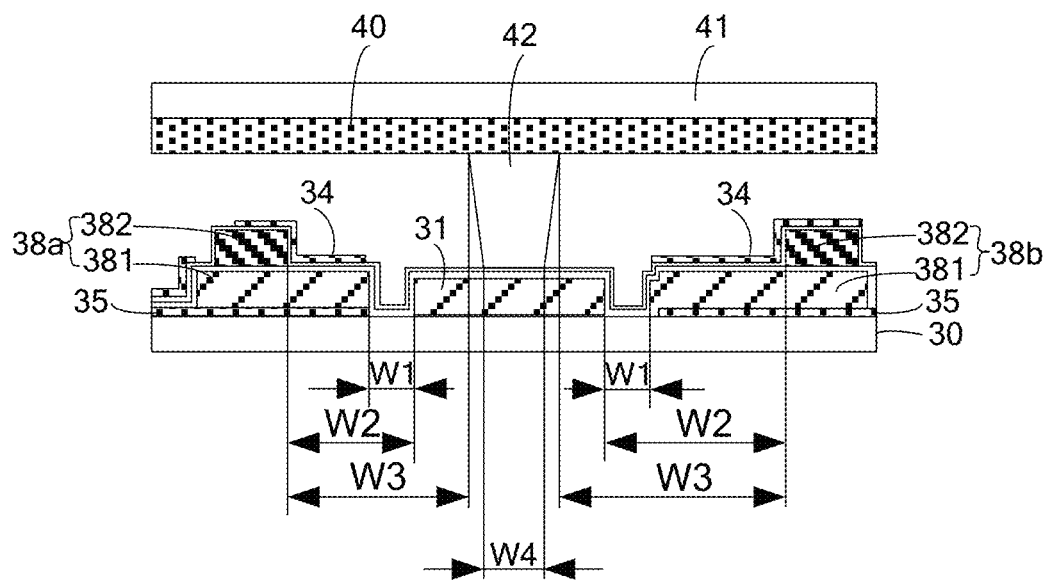
FIG. 7 is a schematic view of a sectional structure along the C-C direction in FIG. 6.

Referring to FIGS. 5 to 7, the array substrate 3 may include a first substrate 30, and a plurality of sub-pixel units, a plurality of scanning lines 31, a plurality of first common lines 32 and a plurality of data lines 33 which are formed on the first substrate 30.

For example, FIG. 5 is a schematic planar structural diagram of a display panel provided by an embodiment of the present disclosure. As illustrated by FIG. 5, the first substrate 30 may include a plurality of sub-pixel regions 301 arranged in an array along a row direction X (second direction) and a column direction Y (first direction), a first wiring region 302 located between two adjacent rows of sub-pixel regions 301, and a second wiring region 303 located between two adjacent columns of sub-pixel regions 303, and the first wiring region 302 is overlapped with the second wiring region 303.

As illustrated by FIG. 5, a plurality of sub-pixel units are formed on the first substrate 30, and each of the plurality of sub-pixel units includes a pixel electrode 34 and a common electrode 35 which are located in the sub-pixel region 301, and a transistor 36 which is at least partially located in the first wiring region 302. In addition, the sub-pixel unit may also include a storage capacitor (not shown in the drawings).

For example, FIG. 6 is an enlarged structural diagram of part A shown in FIG. 5. As illustrated by FIGS. 5 and 6, the transistor 36 can include an active layer 360, a gate electrode 361, and a first electrode 362 and a second electrode 363 which are arranged at the same layer; an insulating layer can be arranged between the gate electrode 361 and the active layer 360 to insulate the gate electrode 361 and the active layer 360 from each other. The insulating layer can be made of an inorganic material, such as silicon oxide and nitrogen oxide. It should be noted that, the gate electrode 361 can be arranged in the same layer as the scanning line 31, and the gate electrode 361 can be a part of the scanning line 31 mentioned above.

For example, the transistor 36 can be a top gate type thin film transistor or a bottom gate type thin film transistor. In the embodiment of the present disclosure, the explanation is mainly made by taking the transistor 36 as a bottom gate type thin film transistor as an example. In the case where the transistor 36 is a bottom gate type thin film transistor, a gate electrode 361 is formed on the first substrate 30, and a material of the gate electrode 361 may include a metal material or an alloy material, such as molybdenum, aluminum, titanium, etc., to ensure its good conductivity. An insulating layer is formed on the first substrate 30 and covers the gate electrode 361. The insulating layer can be made of an inorganic material, such as silicon oxide, silicon nitride and the like. The active layer 360 is formed at a side of the insulating layer away from the first substrate 30, and the first electrode 362 and the second electrode 363 are respectively connected with two doped regions of the active layer 360. The materials of the first electrode 362 and the second electrode 363 may include metal materials or alloy materials, for example, a metal monolayer or multilayer structure made of molybdenum, aluminum and titanium; for example, the multilayer structure is a multi-metal laminated layer, such as a three-layer metal laminated layer (Al/Ti/Al) of titanium, aluminum and titanium.

It should be understood that, a number of transistors 36 in the sub-pixel unit can be set to a plurality, and the transistors 36 are further divided into N-type transistors and P-type transistors, etc.

For example, as illustrated by FIG. 5 and FIG. 6, the pixel electrode 34 can be connected with the first electrode 362, in which the first electrode 362 of the transistor 36 can be the drain electrode and the second electrode 363 can be the source electrode, but the embodiment of the present disclosure is not limited thereto, or the first electrode 362 of the transistor 36 can be the source electrode and the second electrode 363 can be the drain electrode, which depends on the specific situation, while an orthographic projection of the common electrode 35 on the first substrate 30 is overlapped with the orthographic projection of the pixel electrode 34 on the first substrate 30.

For example, at least one of the pixel electrode 34 and the common electrode 35 is the electrode structure described in any one of the previous embodiments, so that the light efficiency around the pixel can be improved, and the quality of the display panel upon the electrode structure being used in the display panel can be improved. It should be noted that the row direction X mentioned in the embodiment of the present disclosure can be the aforementioned second direction X, and the column direction Y can be the aforementioned first direction Y.

For example, FIG. 7 is a schematic view of a cross-sectional structure along a C-C direction in FIG. 6. As illustrated by FIG. 7, the first substrate 30 can be a single-layer structure, the first substrate 30 can be a glass substrate, but the embodiment of the present disclosure is not limited thereto, and the first substrate 30 can also be a multi-layer structure, and the material of the first substrate 30 is not limited to glass, but also other materials, such as polyimide (PI), as the case can be.

In an embodiment of the present disclosure, as illustrated by FIG. 7, the pixel electrode 34 can be located at a side of the common electrode 35 away from the first substrate 30, that is, the common electrode 35 can be manufactured on the first substrate 30 before the pixel electrode 34. For example, the common electrode 35 can be a plate-shaped electrode, that is, the common electrode 35 is a whole piece with no slit, and the pixel electrode 34 can be the electrode structure described in any one of the previous embodiments. By the electric field generated between the pixel electrode 34 and the common electrode 35, all liquid crystal molecules between the electrodes and just above the electrodes are deflected, thereby improving the working efficiency of liquid crystal and increasing the light transmitting efficiency.

It should be understood that, in the embodiment of the present disclosure, a positional relationship between the pixel electrode 34 and the common electrode 35 is not limited to the aforementioned relationship, for example, the pixel electrode 34 can be located at a side of the common electrode 35 close to the first substrate 30, and this common electrode 35 is the electrode structure described in any one of the previous embodiments, while the pixel electrode 34 is a plate electrode.

In the embodiment of the present disclosure, in order to ensure the light transmittance of the array substrate, the pixel electrode 34 can be made of indium tin oxide (ITO) material, but the embodiment of the present disclosure is not limited thereto, and it can also be made of a transparent material such as indium zinc oxide (IZO) or zinc oxide (ZnO), that is, because the material used for the pixel electrode 34 is different from the material of the gate electrode 361, the first electrode 362 and the second electrode 363 of the transistor 36, thus, the pixel electrode 34 and the gate electrode 361, the first electrode 362 and the second electrode 363 of the transistor 36 can be formed by adopting different patterning processes.

For example, as illustrated by FIG. 7, the common electrode 35 can be located at a side of the first electrode 362 and the second electrode 363 of the transistor 36 close to the first substrate 30, and the common electrode 35 can be formed on the first substrate 30 before the gate electrode 361 of the transistor 36 is formed, that is, upon the array substrate being manufactured, the common electrode 35 can be formed on the first substrate 30 by a patterning process, and then the gate electrode 361 of the transistor 36 can be formed on the first substrate 30 by another patterning process. It should be noted that although the common electrode 35 and the gate electrode 361 are both formed on the first substrate 30, the common electrode 35 and the gate electrode 361 are disconnected from each other (that is, not connected). It should be understood that the common electrode 35 can also be formed on the first substrate 30 after the gate electrode 361 of the transistor 36 is formed, and this common electrode 35 can also be located at a side of the gate electrode 361 away from the first substrate 30, as the case can be.

Similarly, in order to ensure the light transmittance of the array substrate, the pixel electrode 34 can also be made of a transparent conductive material, such as ITO. The pixel electrode 34 can be formed at a side of the first electrode 362 and the second electrode 363 of the transistor 36 away from the first substrate 30. It should be understood that an insulating layer is provided between the pixel electrode 34 and the first electrode 362 and the second electrode 363 of the transistor 36, and the pixel electrode 34 can be connected with the first electrode 36 of the transistor through a second via hole structure H2. Specifically, in the case where the pixel electrode 34 is the electrode structure mentioned in the previous embodiment, the pixel electrode 34 can be connected with the first electrode 362 of the transistor through the second via hole structure H2 through a signal connection portion 213, and it should be understood that the signal connection portion 213 can be located in the first wiring region 302.

For example, in the case where the pixel electrode 34 is the electrode structure mentioned in the previous embodiments, opening directions of the slits of the first electrode portions 20 in two pixel electrodes 34 adjacent in the first direction Y and the second direction X are opposite to each other, and opening directions of the slits of the second electrode portions 21 in two pixel electrodes 34 adjacent in the first direction Y and the second direction X are opposite to each other. In addition, it should be noted that the overall shapes of the electrode structures in the array substrate 3 can be slightly different, for example, some electrode structures need to be designed to avoid other structures in the array substrate 3, etc. However, it should be understood that although the overall shapes of the electrode structures in the array substrate 3 may not be completely the same, the overall design concept should be the same, that is, the first electrode portion 20 and the second electrode portion 21 are all half-slit designs, and the first width of the entirety of the conductive connection portion 22 in the fourth direction P is larger than the first width of the first electrode strip 202 in the fourth direction P and the first width of the second electrode strip 212 in the fourth direction P.

For example, as illustrated by FIG. 5, at least one of the scanning lines 31 can be located in one first wiring region 302, in other words, each first wiring region 302 can be provided with at least one scanning lines 31. It should be understood that the entirety of the scanning line 31 can be regarded as extending in the row direction X. The scanning line 31 is connected to the gate electrode 361 of the transistor 36 in the sub-pixel unit. The scanning line 31 mentioned above can be arranged in the same layer as the gate electrode 361 of the transistor 36 and has an integrated structure. The scanning line 31 is configured to provide a scanning signal to the sub-pixel unit.

For example, as illustrated by FIG. 5, at least one of the first common lines 32 can be located in one first wiring region 302, in other words, each first wiring region 302 can be provided with at least one first common line 32. It should be understood that the entirety of the first common line 32 can be regarded as extending in the row direction X, and the first common line 32 can be connected with common electrode 35, and the first common line 32 is configured to provide a common signal to the sub-pixel unit.

For example, the first common line 32 can be arranged in the same layer as the scanning line 31, the aforementioned common electrode 35 can be arranged on the first substrate 30 before the scanning line 31. Therefore, in order to connect the first common line 32 with the common electrode 35, the first common line 32 and the common electrode 35 can be lapped together in the process of manufacturing the first common line 32.

For example, as illustrated by FIG. 5, each first wiring region 302 can be provided with one scanning line 31 and one first common line 32, it can be understood that, the scanning line 31 is disconnected with the first common line 32, that is, an orthographic projection of the scanning line 31 on the first substrate 30 is not overlapped with an orthographic projection of the first common line 32 on the first substrate 30. It should be noted that the first wiring region 302 is not limited to be provided with one row of scanning line 31 and one row of first common line 32, but also can be provided with two rows of scanning lines 31, or no first common lines 32, etc., which depends on the specific situation, and the embodiment of the present disclosure is not limited thereto. The embodiment of the present disclosure is mainly explained by arranging one scanning line 31 and one first common line 32 in each first wiring region 302.

For example, as illustrated by FIG. 5, at least one column of the data line 33 can be located in one second wiring region 303, in other words, each second wiring region 303 can be provided with at least one column of data line 33. It should be understood that the entirety of the data line 33 can be regarded as extending in the column direction Y, and an orthographic projection of the data line 33 on the first substrate 30 is overlapped with orthographic projections of the scanning line 31 and the first common line 32 on the first substrate 30. For example, the data line 33 can be connected to the second electrode 363 of the transistor 36 in the sub-pixel unit, and the data line 33 is configured to provide a data signal to the sub-pixel unit.

For example, in the embodiment of the present disclosure, the data line 33 can be arranged in the same layer as the first electrode 362 and the second electrode 363 of the transistor 36 in the sub-pixel unit, that is, they can be manufactured by the same patterning process to reduce the mask cost. However, the embodiments of the present disclosure are not limited thereto, and can be made by different patterning processes, which depends on the specific situation.

For example, as illustrated by FIG. 5, each second wiring region 303 can be provided with one column of data line 33, the data line 33 can be connected with the second electrodes 363 of sub-pixel units in the same column, that is, the data line 33 can provide data signals for sub-pixel units in the same column.

In the embodiment of the present disclosure, each row of data line 33 can be symmetrically arranged about its central axis. It should be noted that the central axis mentioned here is a line passing through the center of the data line 33 and extending in the column direction Y.

For example, in one row of sub-pixel units, the distance between the first electrode 362 of each sub-pixel unit and the data line 33 connected with the sub-pixel unit in the row direction X is equal, so as to ensure that the coupling capacitance between the transistor 36 and the data line 33 of each sub-pixel unit in each column is close to the same, and further ensure the uniformity of light efficiency at each sub-pixel unit in each column. It should be noted that, while the distance between the first electrode 362 of each sub-pixel unit in a row of sub-pixel units and the data line 33 connected to the first electrode in the row direction X is equal, the overlapping area of the first electrode 362 of this column and the gate electrode 361 needs to be consistent with that of other columns.

For example, as illustrated by FIG. 5, the array substrate may further include a second common line 37, which can be arranged in the same layer as the data line 33 and spaced apart from each other. The second common line 37 extends in the first direction Y. A middle part of an orthographic projection of the second common line 37 on the first substrate 30 is located in the first wiring region 302, and two ends of the second common line 37 are located in the sub-pixel region 301, respectively. In the embodiment of the present disclosure, two ends of the second common line 37 are respectively connected with the common electrodes 35 of two sub-pixels adjacent in the first direction Y through the first via hole structures H1.

Figure 8:
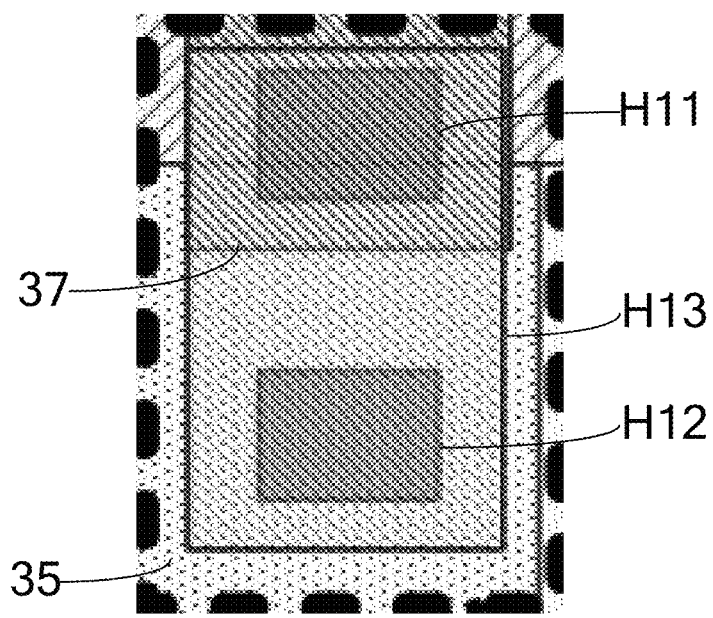
FIG. 8 is an enlarged schematic diagram of the first via hole structure in FIG. 5.

For example, FIG. 8 is an enlarged structural diagram of the first via hole structure in FIG. 5. As illustrated by FIG. 8, the first via hole structure H11 includes a first via hole portion H11, a second via hole portion H12, and a via hole connection portion H13, the via hole connection portion H13 is arranged in the same layer and spaced apart from the pixel electrode 34. The via hole connection portion H13 is connected with the second common line 37 through the first via hole portion H11 and the via hole connection portion H13 is connected with the common electrode 35 through the second via hole portion H12.

For example, as illustrated by FIGS. 5 to 7, the opposite substrate 4 may further include a second substrate 41, a spacer 42 located at a side of the second substrate 41 close to the array substrate 3, and a shielding layer 40 located at a side of the spacer 42 close to the second substrate 41. The specific structure of the second substrate 41 can refer to the descriptions of the first substrate 30, and will not be repeated here. The orthographic projection of the shielding layer 40 on the first substrate 30 can completely cover the first wiring region 302, the second wiring region 303 and at least part of the sub-pixel region 30, and there can be a plurality of spacers 42, which can improve the uniformity of the whole thickness of the display panel and the tolerance of the display panel to the fluctuation of liquid crystal molecules, thereby improving the yield of the display panel.

For example, the plurality of spacers 42 may include a main spacer and an auxiliary spacer. Upon the display panel being not subjected to external pressure, one end of the main spacer is in contact with the array substrate 3, which mainly plays a role of supporting. Upon the display panel being not subjected to external pressure, there is a certain distance between one end of the auxiliary spacer and the array substrate 1, that is, there is a height difference between the main spacer and the auxiliary spacer, and the thickness of the display panel can be fine-adjusted by adjusting the height difference (stage difference) between the main spacer and the auxiliary spacer.

For example, the height of the main spacer is greater than that of the auxiliary spacer. Upon the display panel being subjected to external pressure, the main spacer first bears all the pressures and is compressed. Upon the main spacer being compressed until the stage difference between the main spacer and the auxiliary spacer drops to 0, the main spacer and the auxiliary spacer jointly bear the external pressure.

It should be noted that the main spacer and the auxiliary spacer can be arranged according to a certain period. During the manufacturing process, it is needed to monitor the size and height of different kinds of spacers. Because the size of the spacer is small, and the main spacer is generally few, it is difficult for the equipment to accurately identify the position of the main spacer only depending on the size. Usually, some position around the main spacer is designed with no spacer (i.e., no spacer is arranged) to facilitate faster and more accurate identification of the position of the main spacer and monitor it. For example, when designing, no spacer is arranged under the main spacer, and during monitoring, the position where no spacer is arranged can be quickly determined, and it can be determined that the spacer located at an upper position of the position where no spacer is arranged is the main spacer.

It should be noted that a surface of the spacer 42 close to the first substrate 30 in the embodiment of the present disclosure can be a top surface, and a surface of the spacer 42 away from the first substrate 30 is a bottom surface. As illustrated by FIG. 5, an orthographic projection of the top surface of the spacer 42 on the first substrate 30 is within the orthographic projection of the scanning line 31 on the first substrate 30, that is, an outer contour of the orthographic projection of the top surface of the spacer 42 on the first substrate 30 is located inside an outer contour of the orthographic projection of the scanning line 31 on the first substrate 30, thus ensuring the flatness of the support of the spacer 42 to ensure that the spacer 42 is stably supported on the array substrate 3. It should be noted that the orthographic projection of the spacer 42 on the first substrate 30 in the embodiment of the present disclosure is not overlapped with the orthographic projection of the data line 33 and the transistor on the first substrate 30.

It should be understood that the orthographic projection of the top surface of the spacer 42 on the first substrate 30 in the embodiment of the present disclosure can be located within the orthographic projection of the bottom surface of the spacer 42 on the first substrate 30, that is, the entirety of the spacer 42 can be similar to a cone shape, but the embodiment of the present disclosure is not limited thereto, and the orthographic projection of the top surface of the spacer 42 on the first substrate 30 in the embodiment of the present disclosure can also be in the same position as the bottom surface of the spacer 42, as the case can be.

In addition, it should be noted that the orthographic projection of the bottom surface of the spacer 42 on the first substrate 30 can be located within the orthographic projection of the scanning line 31 on the first substrate 30, but the embodiment of the present disclosure is not limited thereto, and the contour of the spacer 42 in the column direction Y can also exceed the contour of the scanning line 31 in the column direction Y.

For example, in order to prevent the spacer 42 from scratching an alignment film after being moved by external force and causing red spot, a barrier wall can be arranged around the spacer 42. Specifically, because an orthographic projection of the spacer 42 on the first substrate 30 is located within the orthographic projection of the scanning line 31 on the first substrate 30, and the scanning line 31 is covered by the shielding layer 40, even if the spacer 42 moves in the row direction X, the spacer 42 is still located within the range covered by the shielding layer 40, which basically does not affect the display effect. Therefore, it is not needed to arrange a barrier wall on the opposite sides of the spacer 42 in the row direction X, so as to reduce the design difficulty.

In addition, as illustrated by FIG. 5, transistors are arranged on opposite sides of the spacer 42 in the row direction X. The overall height of the region where the transistors are located in the array substrate 3 is greater than the overall height of the region where the spacer 42 is located, that is, this transistor can be used as a barrier wall to prevent the spacer 42 from sliding in the row direction X.

In order to prevent the spacer 42 from slipping excessively in the column direction Y due to external force, as illustrated by FIGS. 5 and 6, a first barrier wall 38a and a second barrier wall 38b can be arranged on the array substrate 3, which are located on opposite sides of the scanning line 31 in the column direction Y, respectively, an orthographic projection of the spacer 42 on the first substrate 30 can be located between the orthographic projections of the first barrier wall 38a and the second barrier wall 38b on the first substrate 30; in other words, the first barrier wall 38a and the second barrier wall 38b can be provided on opposite sides of the spacer 42 in the column direction Y.

It should be noted that at least part of the first barrier wall 38a and the second barrier wall 38b can be located in the sub-pixel region 301; the first barrier wall 38a and the second barrier wall 38b can be shielded by the shielding layer 40.

For example, both the first barrier wall 38a and the second barrier wall 38b include a first barrier layer 381 arranged in the same layer as the scanning line 31 and spaced apart from each other, and a second barrier layer 382 arranged in the same layer as the data line 33 and spaced apart from each other. The orthographic projection of the second barrier layer 382 on the first substrate 30 is overlapped with the orthographic projection of the first barrier layer 381 on the first substrate. For example, as illustrated by FIGS. 5 to 7, the distance between the first barrier layer 381 and the scanning line 31 in the first direction Y is the first distance W1, and the distance between the second barrier layer 382 and the scanning line 31 in the first direction Y is the second distance W2, which is larger than the first distance W1. That is to say, compared with the second barrier layer 382, the first barrier layer 381 is protruded towards the spacer 42, and the protruded part can play a role of supporting upon the spacer being forced to move, so as to alleviate the situation that the spacer 42 falls into the gap between the scanning line 31 and the first barrier layer 381 and cannot be restored to its original state. At the same time, in the embodiment of the present disclosure, the distance between the second barrier layer 382 and the spacer 42 is larger than that between the first barrier layer 381 and the spacer 42. In this way, compared with the technical solution that the distance between the second barrier layer 382 and the spacer 42 and the distance between the first barrier layer 381 and the spacer 42 are designed to be equal, upon the spacer 42 receiving the same external stress, the technical solution provided by embodiment of the present disclosure can reduce the tilting angle of the spacer 42, so that, upon the external stress of the spacer 42 being the force in the horizontal direction (for example, the first direction Y), the resistance in the vertical direction (i.e., a thickness direction of the display panel) can be reduced, and at this time, it is more difficult for the spacer 42 to cross the barrier wall and scratch the alignment film at the light transmitting region (i.e., the area in the sub-pixel region 301 that is not covered by the shielding layer 40), that is, the risk of scratching the alignment film is reduced. In addition, the vertical deformation of the display panel is reduced, and the T-DNU (Touch-Dark Non-uniformity) is also ameliorated.

It should be noted that the surface of the spacer 42 close to the first substrate 30 in the embodiment of the present disclosure can be the top surface, and a size W4 of the top surface of the spacer 42 in the first direction Y can be larger than the first distance W1, so as to alleviate the situation that the spacer 42 falls into the gap between the scanning line 31 and the first barrier layer 381 during the moving process and cannot be restored to its original state.

For example, a ratio between the size W4 of the top surface of the spacer 42 in the first direction Y and the first distance W1 is greater than or equal to 2, so as to further alleviate the situation that the spacer 42 falls into the gap between the scanning line 31 and the first barrier layer 381 during the moving process and cannot be restored to its original state.

For example, the distance between the second barrier layer 382 and the spacer 42 in the first direction Y is the third distance W3, and a ratio between the third distance W3 and the size of the top surface of the spacer 42 in the first direction Y is greater than or equal to 0.5. This design can reduce the risk of the spacer 42 crossing the barrier wall, thus reducing the risk of scratching the alignment film at the light transmitting region. Further, the ratio between the third distance W3 and the size W4 of the top surface of the spacer 42 in the first direction Y can be greater than or equal to 1.

For example, the ratio between the third distance W3 and the size of the data line 33 in the second direction X is 2 to 4; the size of the data line 33 in the second direction X can be 5 μm to 7 μm, such as 5 μm, 5.5 μm, 6 μm, 6.5 μm, 7 μm, etc. At this time, the third distance W3 can be 10 μm to 28 μm, such as 10 μm, 13 μm, 17 μm, 21 μm, 25 μm, 28 μm, etc.

It should be understood that the aforementioned orthographic projection of the second barrier layer 382 on the first substrate 30 is located within the orthographic projection of the first barrier layer 381 on the first substrate 30, which can ensure that the film layers (i.e., the second barrier layer 382) in the first barrier wall 38a and the second barrier wall 38b, which mainly play a role of blocking, have sufficient width in the first direction Y to better block the spacer 42 from sliding in the first direction Y. That is, as illustrated by FIG. 7, the entire longitudinal section of the first barrier wall 38a and the second barrier wall 38b of the embodiment of the present disclosure may seem to be L-shaped, where the longitudinal section refers to a plane parallel to the thickness direction and the first direction Y of the display panel.

It should be noted that the first barrier layer 381 of the aforementioned second barrier wall 38b can be a partial structure of the first common line 32. In addition, the first distance W1, the second distance W2 between the second barrier wall 38b and the scanning line 31, the third distance W3 between the second barrier wall 38b and the spacer 42, the first distance W1, the second distance W2 between the first barrier wall 38a and the scanning line 31, and the third distance W3 between the first barrier wall 38a and the spacer 42 may or may not be equal, which depends on the specific situation.

In the embodiment of the present disclosure, the aforementioned shielding layer 40 not only completely covers the first wiring region 302 and the second wiring region 303, but also covers part of the sub-pixel region 301, specifically, part of the common electrode 35 and part of the pixel electrode 34. There is a coupling electric field in a region of an edge portion of the pixel electrode 34 close to the scanning line 31 and the data line 33, which will lead to the disorder of liquid crystal arrangement, resulting in a failure area and light leakage at the edge of a dark pixel. Therefore, the shielding layer 40 is needed to shield this part of the failure region.

For example, there is a coupling electric field between the pixel electrode 34 and the scanning line 31, that is to say, there is a failure region in a part of the pixel electrode 34 close to the scanning line 31. In order to shield this failure region, the shielding layer 40 can cover the edge of the pixel electrode 34 by at least 5 μm in the column direction Y. It should be noted that, in the case where the color film layer is located on the opposite substrate, the covered distance needs to be increased in consideration of the cell-assembling precision of the upper substrate and the lower substrate, but should not exceed 10 μm to avoid affecting the aperture ratio of the pixel.

In addition, there is also a coupling electric field between the data line 33 and the edge of the pixel electrode 34, that is, a part of the pixel electrode 34 close to the data line 33 in the embodiment of the present disclosure has a failure region. For example, in the case where the liquid crystal molecule 5 is a negative liquid crystal molecule, the electric field will not cause the liquid crystal to rotate, and the shielding layer 40 can cover the edge of the pixel electrode 34 by about 1 μm to shield the shadow region close to the data line 33. On the other hand, in the case where the liquid crystal molecule 5 is a positive liquid crystal molecule, the coupling electric field between the data line 33 and the pixel electrode 34 will not cause obvious dark light leakage, but will cause the crosstalk phenomenon of the liquid crystal molecule to be aggravated. At this time, the shielding layer 40 can cover the edge of the pixel electrode 34 by at least 6 μm to shield the coupling electric field region.

It should be noted that the color film layer used in the liquid crystal display panel can be located on the opposite substrate 4 or on the array substrate 3, which depends on the specific situation.

Based on the above, the liquid crystal display panel in the embodiment of the present disclosure can be used in 4K resolution or 8K resolution display products.

Embodiments of the present disclosure also provide an electronic device including the display panel described in any of the above embodiments.

According to the embodiment of the present disclosure, the specific types of the electronic device are not particularly limited, and the types of electronic device commonly used in the field can be used, such as mobile devices such as liquid crystal displays, cell phones, notebook computers, wearable devices such as watches, VR devices, etc., and those skilled in the art can make corresponding selections according to the specific uses of the display equipment, which will not be described in detail here.

It should be noted that besides the display panel, the electronic device also includes other necessary components and elements. Taking the display as an example, it can also include a backlight module, a housing, a main circuit board, a power cord, etc. This field can be supplemented accordingly according to the specific use requirements of the electronic device, and will not be described here again.

It should be noted that "on", "formed on" and "disposed on" mentioned in the present disclosure can refer to that one layer is directly formed or disposed on another layer, or that one layer is indirectly formed or disposed on another layer, that is, there are other layers between the two layers.

The terms "a", "an", "the", "this" and "at least one" are used to indicate the presence of one or more elements/components/etc. The terms "including" and "having" are used to mean open inclusion and mean that there can be other elements/components/etc. besides the listed elements/components/etc.

In the present disclosure, unless otherwise stated, the term "arranged in the same layer" means that two layers, components, members, elements or parts can be formed by the same patterning process, and the two layers, components, members, elements or parts are generally formed of the same material.

In the present disclosure, unless otherwise stated, the expression "patterning process" generally includes the steps of photoresist coating, exposure, development, etching, photoresist stripping and the like. The expression "one patterning process" refers a process of forming patterned layers, components, components, etc. using a mask plate.

The invention claimed is:

1. A display panel, comprising an array substrate and an opposite substrate which are cell-assembled, wherein,
the array substrate comprises a first substrate, and a scanning line, a data line, a first barrier wall and a second barrier wall which are formed at a side of the first substrate close to the opposite substrate; the data line extends in a first direction, the scanning line extends in a second direction, and the first direction intersects with the second direction; the first barrier wall and the second barrier wall are located at opposite sides of the scanning line in the first direction, respectively, and each of the first barrier wall and the second barrier wall comprises a first barrier layer which is arranged in the same layer as the scanning line and spaced apart from the scanning line, and a second barrier layer which arranged in the same layer as the data line and spaced apart from the data line; an orthographic projection of the second barrier layer on the first substrate overlaps with an orthographic projection of the first barrier layer on the first substrate; a distance between the first barrier layer and the scanning line in the first direction is a first distance, and a distance between the second barrier layer and the scanning line in the first direction is a second distance, the second distance is larger than the first distance, the opposite substrate comprises a second substrate and a spacer located at a side of the second substrate close to the array substrate, a surface of the spacer close to the first substrate is a top surface, and an orthographic projection of the top surface of the spacer is located within an orthographic projection of the scanning line on the first substrate, and located between the orthographic projection of the first barrier wall on the first substrate and the orthographic projection of the second barrier wall on the first substrate; and a size of the top surface of the spacer in the first direction is larger than the first distance;

a length of the first barrier wall is different from a length of the second barrier wall in an extension direction of the scanning line.

2. The display panel according to claim 1, wherein a ratio between the size of the top surface of the spacer in the first direction and the first distance is greater than or equal to 2, and a distance between the second barrier layer and the spacer in the first direction is a third distance, and a ratio of the third distance and the size of the top surface of the spacer in the first direction is larger than or equal to 0.5.

3. The display panel according to claim 2, wherein the ratio of the third distance and the size of the top surface of the spacer in the first direction is larger than or equal to 1, and a ratio between the third distance and a size of the data line in the second direction ranges from 2 to 4.

4. The display panel according to claim 1, wherein the array substrate further comprises a plurality of sub-pixel units, each of the plurality of sub-pixel units comprises a pixel electrode, the pixel electrode comprises a conductive connection portion, a first electrode portion comprising a first connection bar extending in the first direction and a plurality of first electrode strips arranged at intervals in the first direction; a second electrode portion spaced apart from the first electrode portion in the first direction, wherein the second electrode portion comprises a second connection bar extending in the first direction and a plurality of second electrode strips spaced apart in the first direction, the conductive connection portion comprises a first conductive connection bar and a second conductive connection bar which are arranged at intervals in the second direction and both extend in the first direction, and at least two third conductive connection bars located between the first conductive connection bar and the second conductive connection bar and arranged at intervals in the first direction, and two ends of each of the third conductive connection bars are connected with the first conductive connection bar and the second conductive connection bar, respectively, wherein the first conductive connection bar is connected with the first connection bar, and the second conductive connection bar is connected with the second connection bar.

5. The display panel according to claim 4, wherein the first electrode strips, the second electrode strips and the third conductive connection bars all extend in a third direction, and a first width of each of the first electrode strips, a first width of each of the second electrode strips and a first width of each of the third electrode strips are equal, wherein the first width is a size in a fourth direction, the third direction is perpendicular to the fourth direction, and the third direction intersects the first direction and the second direction.

6. An electrode structure, comprising a first electrode portion and a second electrode portion arranged at intervals in a first direction, and a conductive connection portion located between the first electrode portion and the second electrode portion, wherein, the first electrode portion comprises a first connection bar extending in the first direction and a plurality of first electrode strips arranged at intervals in the first direction, the first connection bar has a first side and a second side opposite to each other in a second direction, the plurality of first electrode strips are located at the first side of the first connection bar and connected with the first connection bar, and ends of adjacent first electrode strips away from the first connection bar are open;

the second electrode portion comprises a second connection bar extending in the first direction and a plurality of second electrode strips arranged at intervals in the first direction, and the second connection bar is located at a position of the first side away from the second side, the second connection bar comprises a third side and a fourth side which are opposite to each other in the second direction, the third side is located at a position of the fourth side close to the first side; the plurality of second electrode strips are located at the third side of the second connection bar and connected with the second connection bar, and ends of adjacent second electrode strips away from the second connection bar are open;

two ends of the conductive connection portion are connected with the first connection bar and the second connection bar, respectively;

a length of the first barrier wall is different from a length of the second barrier wall in an extension direction of the scanning line.

7. The electrode structure according to claim 6, wherein an area of the conductive connection portion is larger than an area of each of the first electrode strips, and is larger than an area of each of the second electrode strips, and the area of the first electrode portion and the area of the second electrode portion are both larger than the area of the conductive connection portion.

8. The electrode structure according to claim 6, wherein the conductive connection portion comprises a first conductive connection bar and a second conductive connection bar which are arranged at intervals in the second direction and both extend in the first direction, and at least two third conductive connection bars located between the first conductive connection bar and the second conductive connection bar and arranged at intervals in the first direction, two ends of each of the third conductive connection bars are connected with the first conductive connection bar and the second conductive connection bar, respectively; and the first conductive connection bar is connected with the first connection bar, and the second conductive connection bar is connected with the second connection bar.

9. The electrode structure according to claim 8, wherein the first electrode strips, the second electrode strips and the third conductive connection bars all extend in a third direction, and first widths of each of the first electrode strips, each of the second electrode strips and each of the third electrode strips in a fourth direction are equal, wherein the third direction is perpendicular to the fourth direction, and the third direction intersects the first direction and the second direction;

the ends of the adjacent first electrode strips away from the first connection strip are not connected to each other; the ends of the adjacent second electrode strips away from the second connection strip are not connected to each other;

the first width of each of the first electrode strips in the fourth direction and the first width of each of the second electrode strips in the fourth direction are smaller than the first width of an entirety of the conductive connection portion in the fourth direction; and a length of the first conductive connection bar in the first direction and a length of the second conductive connection bar in the first direction are both shorter than a length of the first connection bar in the first direction and a length of the second connection bar in the first direction.

10. The electrode structure according to claim 9, wherein a first slit is provided between adjacent first electrode strips, the plurality of first electrode strips and the first slit extend in the same direction, and the first slit is semi-open; a second slit is provided between adjacent second electrode strips, the plurality of second electrode strips and the second slit extend in the same direction, and the second slit is semi-open; an opening direction of the first slit and an opening direction of the second slit are opposite to each other;

a first width of the first slit in the fourth direction is 1 to 4 times of a first width of the first electrode strip in the fourth direction; and a third slit is provided between adjacent third conductive connection bars, and the third slit is closed.

11. The electrode structure according to claim 10, wherein a first width of each of the first electrode strips in the fourth direction and a first width of each of the second electrode strips in the fourth direction are equal, and the first width of the first slit in the fourth direction and a first width of the second slit in the fourth direction are equal.

12. The electrode structure according to claim 10, wherein the conductive connection portion comprises a plurality of the third slits; the first width of the third conductive connection bar in the fourth direction is equal to the first width of each of the first electrode strips in the fourth direction, and the first width of the third slit, the first width of the first slit, and the first width of the second slit are equal.

13. The electrode structure according to claim 9, wherein the length of the first connection bar in the first direction is smaller than the length of the second connection bar in the first direction; a ratio of the length of the first connection bar in the first direction to the length of the second connection bar in the first direction ranges from 0.1 to 0.9.

14. The electrode structure according to claim 6, wherein a second width of the first connection bar in the second direction is equal to a second width of the second connection bar in the second direction; the second width of the first connection bar in the second direction and the second width of the second connection bar in the second direction are greater than or equal to the first width of each of the first electrode strips in the fourth direction and the first width of each of the second electrode strips in the fourth direction.

15. The electrode structure according to claim 6, wherein an entity of the first connection bar, the conductive connection portion and the second connection bar is in a folded line shape, one end of the first connection bar is connected with one end of the conductive connection portion, another end of the conductive connection portion is connected with an end of the second connection bar, and the first connection bar and the second connection bar are located at different sides of the conductive connection portion in the second direction.

16. The electrode structure according to claim 6, wherein a second width of the first conductive connection bar in the second direction is equal to a second width of the first connection bar in the second direction, and a second width of the second conductive connection bar in the second direction is equal to a second width of the second connection bar in the second direction.

17. The electrode structure according to claim 6, wherein the conductive connection portion comprises a conductive connection bar, the conductive connection bar extends in a third direction, and the third direction intersects the first direction and the second direction.

18. The electrode structure according to claim 17, wherein the third direction is perpendicular to a fourth direction, and a ratio of the first width of the conductive connection bar in the fourth direction to the first width of each of the first electrode strips in the fourth direction ranges from 1.5 to 5.5.

19. The electrode structure according to claim 18, wherein the first width of the conductive connection bar in the fourth direction ranges from 5 µm to 10 µm, and the first width of the first electrode strip in the fourth direction ranges from 1.8 µm to 3 µm.

20. The electrode structure according to claim 18, wherein the second width of the first connection bar in the second direction and the second width of the second connection bar in the second direction both range from 2.3 µm to 2.7 µm, and the first width of the conductive connection bar in the fourth direction ranges from 2.5 µm to 3.0 µm, the first width of each of the first electrode strips in the fourth direction and the first width of each of the second electrode strips in the fourth direction both range from 1.8 µm to 2.6 µm.

* * * * *